United States Patent Office 3,258,479
Patented June 28, 1966

3,258,479
POLYESTERS OF ORGANOBORON DIOLS WITH ORGANOBORON DICARBOXYLIC ACIDS OR ACID HALIDES
Roy P. Alexander, Killingworth, and Theodore L. Heying, North Haven, Conn., assignors to Olin Mathieson Chemical Corporation, a corporation of Virginia
No Drawing. Filed Mar. 27, 1964, Ser. No. 356,016
5 Claims. (Cl. 260—485)

This invention relates to novel organoboron polyesters and to a process for the preparation of these materials. In the process of this invention an organoboron diol or a mixture of diols of the formula:

$$RR'B_{10}H_8[CR''CR''']$$

wherein R and R' are each selected from the group consisting of hydrogen or an alkyl group of from 1 to 5 carbon atoms and wherein R'' is selected from the group consisting of hydrogen and hydroxyalkyl containing at least 2 carbon atoms and R''' is selected from the group consisting of hydroxyalkyl and the radical

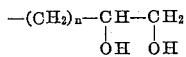

wherein n is an integer of from 1 to 6 inclusive, and with the proviso that when R'' is hydrogen, R''' is the radical

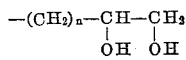

wherein n is as previously defined, is reacted in a condensation reaction with at least one material selected from the group consisting of (A) an organoboron dicarboxylic acid halide $$RR'B_{10}H_8[C(COX)]_2$$

wherein R and R' are each selected from the group consisting of hydrogen or an alkyl of 1 to 5 carbon atoms and X is a halogen selected from the group consisting of chlorine, bromine and iodine and (B) an organoboron dicarboxylic acid of the formula:

$$RR'B_{10}H_8[CR_1CR_1]$$

wherein R and R' are each selected from the group consisting of hydrogen or an alkyl group of from 1 to 5 carbon atoms and $R_1$ is a carboxyalkyl radical having 2 to 4 carbon atoms.

In the process of this invention the organoboron diol or a mixture of organoboron diols is mixed in approximately equimolar quantities with an organoboron dicarboxylic acid, an organoboron dicarboxylic acid halide or a mixture of the acid and the acid halide. Preferably the mixture is then heated with stirring under a nitrogen atmosphere to a temperature of from approximately 70° C. to about 200° C. and maintained at that temperature for about 2 to 4 hours. Vacuum is then applied gradually and the temperature is raised from about 175° to about 200°. The last-mentioned temperature is maintained for from about 1 to 7 hours or more. The polyester product, which may be a solid, can be separated from unreacted starting material, for example, by grinding the solid, crude polyester to a powder, thoroughly treating the powder with sodium hydroxide, washing the polyester product with dilute mineral acid followed by drying under vacuum. The melting point (actually the beginning of the softening range) can be determined by any convenient method such as by means of a Fisher-Johns block.

Organoboron dicarboxylic acids which can be employed in preparing the novel polyesters of this invention can be synthesized by reacting an organoboron alcohol of the type:

$$RR'B_{10}H_8(CR''CR'')$$

wherein R and R' are each selected from the group consisting of hydrogen and an alkyl radical containing 1 to 5 carbon atoms and R'' is a hydroxyalkyl radical containing at least 2 carbon atoms with an oxidizing agent capable of oxidizing the hydroxyl groups to a carboxyl group as set forth in Ager, Alexander and Heying application Serial No. 812,066, filed May 8, 1959, for Composition and Method (now abandoned). Useful organoboron dicarboxylic acids include, for example, $$B_{10}H_{10}[C(CH_2COOH)]_2, CH_3B_{10}H_9[C(CH_2COOH)]_2$$

$$CH_3CH_2CH_2CH_2B_{10}H_9[C(CH_2CH_2COOH)]_2$$

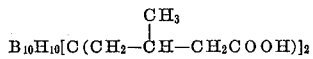

and $(CH_3)_2B_{10}H_8[C(CH_2)_3COOH]_2$. The compound $B_{10}H_{10}[C(CH_2COOH)]_2$ can be prepared by dissolving $B_{10}H_{10}[C(CH_2CH_2OH)]_2$ in acetone and then oxidizing the alcohol with a chromic acid-sulfuric acid admixture.

Organoboron diols suitable as starting materials in the process of this invention can be prepared by the alkaline hydrolysis of compounds of the class:

$$RR'B_{10}H_8(CR''CR'')$$

wherein R and R' are each selected from the group consisting of hydrogen and an alkyl radical having 1 to 5 carbon atoms and R'' is a radical of the class:

wherein $R_1$ is a bivalent saturated hydrocarbon radical containing 1 to 7 carbon atoms, $R_2$ is an alkyl radical containing 1 to 6 carbon atoms, and the total number of carbon atoms in the $R_1$ radical portion of both R'' substituents is not more than 8, as described in Ager and Heying U.S. Patent 3,166,597. For example, the compound $B_{10}H_{10}[C(CH_2OH)]_2$ can be prepared by allowing a solution of the

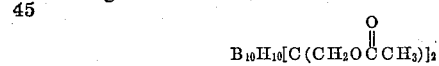

in methanol, potassium hydroxide and water to stand at room temperature for 4 hours followed by heating at 60° C. for about 20 minutes. The cooled solution is poured into water and made acidic yielding the diol product as a precipitate. Useful organoboron diols include $$B_{10}H_{10}[C(CH_2OH)]_2, CH_3B_{10}H_9[C(CH_2CH_2OH)]_2$$
$$C_2H_5B_{10}H_9[C(CHOHCH_3)]_2, B_{10}H_{10}[C(CH_2CH_2OH)]_2$$
$$CH_3CH_2CH_2B_{10}H_9[C(CH_2OH)]_2$$
$$(CH_3)_2B_{10}H_8[C(CH_2CH_2CH_2CH_2OH)]_2$$

etc.

Diols of the type represented for example, by the compound $B_{10}H_{10}[CHC(CH_2CHOHCH_2OH)]$ by hydrolyzing by reaction with water in the presence of a hydration catalyst selected from the group consisting of sulfuric, hydrochloric, phosphoric, oxalic, formic, acetic, and trichloroacetic and, a compound of the formula $$RR'B_{10}H_8(CR''CR''')$$

wherein R and R' are each selected from the group consisting of hydrogen and a lower alkyl radical containing from 1 to 5 carbon atoms, wherein one of R'' and R''' is hydrogen and wherein one of R″ and R‴ is a radical of the class:

$$-(CH_2)_n-CH-CH_2$$
$$\underset{O}{\diagdown\diagup}$$

wherein n is an integer of from 1 to 6 inclusive as described in Heying Patent U.S. 3,121,119. The diol $$B_{10}H_{10}[CHC(CH_2CHOHCH_2OH)]$$

can be prepared by hydrolyzing epoxyallylcarborane in refluxing 5 percent sulfuric acid. Suitable diols of this type include $B_{10}H_{10}[CHC(CH_2CH_2CHOHCH_2OH)]$, $$CH_3B_{10}H_9[CHC(CH_2\overset{\overset{\displaystyle CH_3}{|}}{C}H-CH_2CHOHCH_2OH)]$$

$$(C_2H_5)_2B_{10}H_8[CHC(CH_2CH_2CH_2CHOHCH_2OH)]$$

etc. wherein R″ is selected from the group consisting of hydrogen and hydroxyalkyl containing at least 2 carbon atoms and R‴ is selected from the group consisting of hydroxyalkyl and the radical $$-(CH_2)_n-\underset{\underset{\displaystyle OH}{|}}{C}H-\underset{\underset{\displaystyle OH}{|}}{C}H_2$$

wherein n is an integer of from 1 to 6 inclusive, and with the proviso that when R″ is hydrogen, R‴ is the radical $$-(CH_2)_n-\underset{\underset{\displaystyle OH}{|}}{C}H-\underset{\underset{\displaystyle OH}{|}}{C}H_2$$

wherein n is as previously defined.

The organoboron dicarboxylic acid halides useful in the process of this invention can be prepared by reacting an organoboron dicarboxylic and of the class:

$$RR'B_{10}H_8[C(COOH)]_2$$

wherein R and R′ are each hydrogen or an alkyl group containing 1 to 5 carbon atoms with an inorganic acid halide in the presence of a halogen as described in Ager and Reid U.S. Patent 3,109,026. For example, the compound $B_{10}H_{10}[C(COCl)]_2$ can be made by reacting $B_{10}H_{10}[C(COOH)]_2$ with phosphorus oxychloride in the presence of chlorine at 90° C. for about 2 hours. Other organoboron dicarboxyl acid halides suitable as starting materials in the process of this invention include $$CH_3B_{10}H_9[C(COCl)]_2, \quad (C_2H_5)_2B_{10}H_8[C(COCl)]_2$$

etc. and the corresponding bromine and iodine derivatives.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as pyrotechnic type igniter, and are mechanically strong enough to withstand ordinary handling.

Cross-linking of the chain type or linear polyesters can also be achieved by the use of cross-linking agents. Unsaturated compounds of the formula:

$$R''OOC-R-COOR'$$

wherein R is an aliphatic carbon chain, either saturated alkyl or unsaturated alkyl with one C=C bond, and R′ is an unsaturated alkyl group are useful. Diallyl succinate and diallyl fumarate are examples of such compounds. Other agents which are useful include maleic anhydride, maleic amide, metal salts of unsaturated aliphatic mono- and dicarboxylic acids, e.g., zinc acrylate, and organo- silicon compounds. The introduction of such agents as chain connectors broadens the range of elasticity. The amount of agent should be in the range of about 1 to 18 percent by weight based on the amount of the ester. Addition of catalytic amounts, e.g., about 1 to 8 percent based on the cross-linking agent, of a peroxide such as dibenzoylperoxide or di-cumylperoxide can be useful in some instances.

The following examples illustrate this invention but are to be considered not limitative:

*Example I*

5 g. (0.02 M) of $B_{10}H_{10}[C(CH_2CH_2OH)]_2$, 6.5 g. (0.025 M) of $B_{10}H_{10}[C(CH_2COOH)]_2$, 50 ml. of benzene and 10 drops of sulfuric acid were refluxed for 25 hrs. in a 200 ml. in a flask equipped with a Dean-Starke trap and a condenser. During the refluxing operation 0.88 g. of water was collected. An additional 100 ml. of benzene was added and the mixture was filtered. The filtrate was evaporated, dissolved in 50 ml. ether, washed with water, dried over 5 g. of $MgSO_4$ and evaporated. A total of 4.2 g. of a soft, solid polyester product was recovered (M.P. 30–45° C.). The product was analyzed and found to contain 42 percent boron.

*Example II*

1.5 g. (.00577 M) of $B_{10}H_{10}[C(CH_2COOH)]_2$ and 1.34 g. (.00577 M) of $B_{10}H_{10}[C(CH_2CH_2OH)]_2$ were mixed together and heated with stirring in a 100 ml. round bottom flask. Details relating to the heating period are given below:

| Time (hours) | Temp. (° C.) | Pressure |
|---|---|---|
| 0 | 100 | 1 atm. |
| 0.25 | 100 | 1 atm. |
| 0.50 | 130 | 1 atm. |
| 1.25 | 130 | 1 atm. |
| 1.50 | 160 | 1 atm. |
| 1.75 | 165 | 1 atm. |
| 1.92 | 170 | 1 atm. |
| 2.08 | 185 | 1 atm. |
| 3.08 | 185 | 0.1 mm. Hg. |
| 6.45 | 185 | 0.1 mm. Hg. |
| 10.33 | 185 | 0.1 mm. Hg. |
| 15.08 | 185 | 0.1 mm. Hg. |

A solid product which softened at 104° C. was obtained. The crude product was dissolved in 50 ml. of chloroform, filtered and the chloroform removed by evaporation yielding a purified, solid polyester product which softened at 53–60° C. The molecular weight of the polyester product as determined in ethanol by light scattering was 12,000.

*Example III*

1.5 g. (.00558 M) of $B_{10}H_{10}[C(COCl)]_2$ and 1.2 g. (.00517 M) of $B_{10}H_{10}[C(CH_2CH_2OH)]_2$ were mixed and heated with stirring as follows:

| Time (hours) | Temp. (° C.) | Pressure |
|---|---|---|
| 0 | (¹) | 1 atm. |
| 0.08 | 50 | 1 atm. |
| 0.33 | 100 | 1 atm. |
| 0.50 | 125 | 1 atm. |
| 0.83 | 150 | 1 atm. |
| 3.08 | 170 | 1 atm. |
| 3.92 | 170 | ~0.1 mm. Hg. |
| 7.33 | 170 | ~0.1 mm. Hg. |

¹ R.T.

The resulting solid polyester product softened at 100° C. and had a molecular weight in ethanol of 5,900 as determined by the light scattering technique.

*Example IV*

1 g. (.00431 M) of $B_{10}H_{10}[C(CH_2CH_2OH)]_2$, 0.56 g. (.00215 M) $B_{10}H_{10}[C(CH_2COOH)]_2$ and 0.58 g. (.00216 M) of $B_{10}H_{10}[C(COCl)]_2$ were mixed and heated with stirring. Details relating to the heating steps were as follows:

| Time (hours) | Temp. (° C.) | Pressure |
|---|---|---|
| 0 | (1) | 1 atm. |
| 0.17 | 80 | 1 atm. |
| 0.50 | 160 | 1 atm. |
| 2.00 | 180 | 1 atm. |
| 3.67 | 185 | ~0.1 mm. Hg. |
| 7.67 | 185 | ~0.1 mm. Hg. |

[1] R.T.

The resulting polyester product, which melted at 130–135° C. was dissolved in chloroform, filtered and the chloroform solution poured into pentane. The purified polyester product which precipitated was dried under vacuum yielding a solid polyester product (M.P. 130–135° C.). The molecular weight as determined by the light scattering technique was 53,000.

Example V

A 1 liter, three-necked flask was charged with 78.0 g. (0.3 M) of $B_{10}H_{10}[C(CH_2COOH)]_2$, 62.7 g. (0.27 M) of $B_{10}H_{10}[C(CH_2CH_2OH)]_2$ and 6.12 g. (0.03 M) of $B_{10}H_{10}[C(CH_2OH)]_2$. The mixture was stirred vigorously, a slow stream of nitrogen passed through the flask and the flask was heated at 130° C. in an oil bath. After 6 hours, the pressure in the flask was reduced to 100–200 mm. Hg and the oil bath temperature was set at 120° C. and left overnight. The next morning, the temperature of the oil bath was raised to 190° C. which resulted in considerable foaming. Over the next two hours, the pressure in the flask was reduced to 15 mm. Hg while the temperature remained at 190° C. (Foaming decreased.) After the reaction mixture had been maintained four hours at 15 and 193° C., the vacuum was released, the mixture was taken from the oil bath and poured into an evaporating dish where it quickly solidified into a brittle, tan-colored, glass-like polyester product. It was ground to a powder (yield—112.8 g. or 82.3 percent of the theoretical quantity) which had a softening point of 88° C. and a melting point of 92° C. The molecular weight of the product was 11,500 as determined by light scattering technique in ethanol. The polyester product was analyzed for boron, carbon and hydrogen and the following results were obtained: boron—46.5 percent; carbon—31.5, 34.3, 37.7 percent, and hydrogen—8.0 percent.

Examples VI–XV

In these examples the organoboron dicarboxylic acid or organoboron dicarboxylic acid halide together with an organoboron diol or mixture of diols was heated with stirring under a nitrogen atmosphere to a temperature of about 150° C. and maintained at that temperature for several hours. Vacuum was then applied gradually and the temperature was raised to about 175–190° C. and the last mentioned temperature was maintained from 1 to 7 hours. The polyester product was then ground to a powder and thoroughly treated with 1 N sodium hydroxide to remove unreacted monomers, washed with dilute hydrochloric acid, and finally dried under vacuum. Pertinent data relating to these examples are shown in Table I which follows:

TABLE I.—POLYESTER PRODUCTS

| Example Numbers [1] | VI | VII | VIII | IX | X | XI | XII | XIII | XIV | XV |
|---|---|---|---|---|---|---|---|---|---|---|
| $B_{10}H_{10}[C(COCl)]_2$ | 1 | | | | | | | 1 | 1 | |
| $B_{10}H_{10}[C(CH_2COOH)]_2$ | | 1 | 1 | 1 | 1 | 1 | 1 | | | 1 |
| $B_{10}H_{10}[C(CH_2OH)]_2$ | 1 | 1 | | 0.67 | 0.5 | 0.33 | 0.1 | | | |
| $B_{10}H_{10}[C(CH_2CH_2OH)]_2$ | | | 1 | 0.33 | 0.5 | 0.67 | 0.9 | | 0.5 | |
| $B_{10}H_{10}[C(CHOHCH_3)]_2$ | | | | | | | | 1 | 0.5 | 0.5 |
| Melting point, ° C.[2] | 300 | 305 | 130 | 220 | 180 | 120 | 70 | 305 | 85 | 270 |

[1] The figures under each example number indicate the molar ratio of the particular monomers employed in the example as well as the specific monomers utilized.
[2] Ranges are usually observed.

Examples XVI–XXV

A number of additional polyester products were prepared in the manner utilized in the examples shown in Table II. In Examples XVI–XXV where the organoboron dicarboxylic acid halide was utilized, the reaction temperature was about 125° C., while in those examples where the organoboron dicarboxylic acid was used, the reaction temperature was greater than about 170° C. Details relating to Examples XVI–XXV are found in Table II which follows:

TABLE II.—POLYESTER PRODUCTS

| Example Numbers [1] | XVI | XVII | XVIII | XIX | XX | XXI | XXII | XXIII | XXIV | XXV |
|---|---|---|---|---|---|---|---|---|---|---|
| $B_{10}H_{10}[C(COCl)]_2$ | | | | | | | | | | 0.5 |
| $B_{10}H_{10}[C(CH_2COOH)]_2$ | 1 | 1 | 1 | 1 | | | 1 | | 1 | 0.5 |
| $B_{10}H_{10}[C(CH_2OH)]_2$ | | | | | | | | 0.1 | 0.33 | |
| $B_{10}H_{10}[C(CH_2CH_2OH)]_2$ | 0.75 | 0.25 | 0.9 | 0.67 | 1 | 1 | | 0.9 | 0.33 | |
| $B_{10}H_{10}[C(CHOHCH_3)]_2$ | 0.25 | 0.75 | 0.1 | 0.33 | | | | | | |
| $B_{10}H_{10}[CHC(CH_2CHOHCH_2OH)]$ | | | | | | | 1 | | 0.33 | |
| M.P. (° C.) Crude [2] | 95 | 120 | 90 | 95 | 100 | 100 | 100 | | 100 | |
| M.P. (° C.) Purified [2] | | | | | 170 | 50 | | 45 | 85 | |
| Mol. Weight | | | | | 6,000 | 8,300 | 4,500 | 4,500 | 11,000 | |

[1] The figures under each example number indicate the molar ratio of the particular monomers employed in the example as well as the specific monomers utilized.
[2] Ranges are usually observed.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

What is claimed is:

1. A solid polyester of an organoboron diol of the formula:

$$RR'B_{10}H_8[CR''CR''']$$

and mixtures thereof, and a material selected from the group consisting of (A) an organoboron dicarboxylic acid halide of the formula:

$$RR'B_{10}H_8[C(COX)]_2$$

and (B) an organoboron dicarboxylic acid of the formula:

$$RR'B_{10}H_8[CR_1CR_1]$$

and mixtures of (A) and (B); wherein R and R' are each selected from the group consisting of hydrogen and alkyl of from 1 to 5 carbon atoms; R'' is selected from the group consisting of hydrogen and hydroxyalkyl having from 2 to 7 carbon atoms and R''' is selected from the group consisting of hydroxyalkyl having from 2 to 7 carbon atoms and the radical $$-(CH_2)_n-\underset{\underset{OH}{|}}{C}H-\underset{\underset{OH}{|}}{C}H_2$$

wherein $n$ is an integer of from 1 to 6 inclusive, and with the proviso that when R'' is hydrogen, R''' is the radical $$-(CH_2)_n-\underset{\underset{OH}{|}}{C}H-\underset{\underset{OH}{|}}{C}H_2$$

X is a halogen selected from the group consisting of chlorine, bromine and iodine and $R_1$ is a carboxyalkyl radical having from 2 to 4 inclusive carbon atoms; the said polyester having a molecular weight of from 5900 to 53,000.

2. The polyester of claim 1 wherein the diol is $B_{10}H_{10}[C(CH_2CH_2OH)]_2$ and the said material is $$B_{10}H_{10}[C(COCl)]_2$$

3. The polyester of claim 1 wherein the diol is $B_{10}H_{10}[C(CH_2CH_2OH)]_2$ and the said material is a mixture of $B_{10}H_{10}[C(CH_2COOH)]_2$ and $B_{10}H_{10}[C(COCl)]_2$.

4. The polyester of claim 1 wherein the diol is a mixture of $B_{10}H_{10}[C(CH_2CH_2OH)]_2$ and $$B_{10}H_{10}[C(CH_2OH)]_2$$

and the said material is $B_{10}H_{10}[C(CH_2COOH)]_2$.

5. The polyester of claim 1 wherein the diol is $B_{10}H_{10}[C(CH_2OH)]_2$ and the said material is $$B_{10}H_{10}[C(COCl)]_2$$

References Cited by the Examiner

UNITED STATES PATENTS 3,167,590   1/1965   Heying _____ 260—606.5

LORRAINE A. WEINBERGER, *Primary Examiner.*
REUBEN EPSTEIN, *Examiner.*
L. A. SEBASTIAN, I. R. PELLMAN,
*Assistant Examiners.*